US006400259B1

(12) United States Patent
Bourcart et al.

(10) Patent No.: US 6,400,259 B1
(45) Date of Patent: Jun. 4, 2002

(54) SAFETY ARRANGEMENT FOR USE IN A MOTOR VEHICLE

(75) Inventors: Denis Bourcart, Les Lilas; Jean-Luc Morantin, Andresy, both of (FR)

(73) Assignee: Autoliv Development AB, Vågårda (SE)

(*) Notice: Subject to any disclaimer, the term of this patent is extended or adjusted under 35 U.S.C. 154(b) by 0 days.

(21) Appl. No.: 09/485,095

(22) PCT Filed: Aug. 4, 1998

(86) PCT No.: PCT/SE98/01435

§ 371 (c)(1),
(2), (4) Date: Jun. 15, 2000

(87) PCT Pub. No.: WO99/06244

PCT Pub. Date: Feb. 11, 1999

(30) Foreign Application Priority Data

Aug. 4, 1997 (GB) ............................................. 9716479

(51) Int. Cl.⁷ .................................................. B60Q 1/00
(52) U.S. Cl. .................................................. 340/425.5
(58) Field of Search ......................... 340/425.5, 438, 340/667, 686.1; 280/735, 728.1; 701/45

(56) References Cited

U.S. PATENT DOCUMENTS

| 4,934,722 A | 6/1990 | Motozawa | 294/480 |
|---|---|---|---|
| 5,155,467 A | * 10/1992 | Matsubara | 340/429 |
| 5,324,071 A | 6/1994 | Gotomyo et al. | 280/730 |
| 6,130,608 A | * 10/2000 | McKeown et al. | 340/438 |
| 6,158,768 A | * 12/2000 | Steffani, Jr. et al. | 280/735 |
| 6,161,891 A | * 12/2000 | Blakesley | 296/65.01 |

FOREIGN PATENT DOCUMENTS

| DE | 196 14 161 | 10/1996 |
|---|---|---|
| DE | 195 45 220 | 6/1997 |
| EP | 0 520 535 | 12/1992 |
| EP | 0 680 854 | 11/1995 |
| EP | 0 827 871 | 3/1998 |
| WO | WO 89/05049 | 6/1989 |

* cited by examiner

Primary Examiner—Daryl Pope
(74) Attorney, Agent, or Firm—Venable; Robert Kinberg

(57) ABSTRACT

A safety arrangement for use in a motor vehicle, the safety arrangement comprising a rail (7) provided on the floor of the vehicle and a vehicle seat (1) movably mounted on the rail means, the rail means being associated with one or more transmitting antennas (9) and the seat being associated with one or more receiving antennas (10), and means (12) to supply a signal to at least one transmitting antenna to transfer power to at least one receiving antenna, there being a safety device (4) mounted in or on the seat, actuating means being provided to use the power transferred to the said receiving antenna to actuate the said safety device.

21 Claims, 5 Drawing Sheets

SAFETY ARRANGEMENT FOR USE IN A MOTOR VEHICLE

BACKGROUND OF THE INVENTION

THE PRESENT INVENTION relates to a safety arrangement, and more particularly relates to a safety arrangement in a motor vehicle such as a motor car.

It has been proposed previously to provide safety managements in a motor car, which are adapted to be activated in the event that an accident should occur, with the safety arrangements incorporating devices mounted on the seat of the motor vehicle.

For example it has been proposed to provide an inflatable air-bag, initially stored within the back-rest of a vehicle seat, the air-bag being adapted to occupy a position between the main part of the torso of the occupant of the seat and the side of the vehicle in the event that an accident should occur. Also, it has been proposed to provide a pre-tensioner mounted directly on the seat of a motor vehicle, the pre-tensioner being adapted to apply tension to a seat belt in the event that an accident should occur, so as to retain the person wearing the seat belt firmly in position in the seat.

It is known that seats may be adjustably mounted in position within a motor vehicle, with the seats sliding forwardly and rearwardly along rails mounted on the floor pan of the motor vehicle. A seat can thus be adjusted to a position which is comfortable for the occupant of the seat. In such a situation it has been proposed to provide an electrical connection to a safety device mounted on the seat in the form of a wire or cable which extends from the seat to the main wiring loom of the vehicle. This wire or cable is generally located beneath the seat. The cable can become worn or damaged if the position of the seat is adjusted many times, and also the wire or cable may be become snagged or damaged if objects are placed under the seat.

There is an increasing demand for vehicles in which seats can be completely removed from the vehicle in order to enhance the space available for transporting items within the vehicle. It has previously proved impracticable to provide a safety device in such a seat which requires electric power or other signals from the main wiring loom of the vehicle. It would not be appropriate to provide a wire which would need to be plugged in when a seat is replaced in a vehicle, since many owners of vehicles may not connect such plugs when installing seats in vehicles.

SUMMARY OF THE INVENTION

The present invention seeks to provide an improved safety arrangement in which electric power and/or control signals to activate a safety device can be passed reliably to a seat which is movably mounted within a motor vehicle, or which may be completely removed from the motor vehicle.

According to this invention there is provided a safety arrangement for use in in a motor vehicle, the safety arrangement comprising rail means provided on the floor of the vehicle and a vehicle seat movably mounted on the rail means, the rail being associated with a plurality of primary coils at positions spaced along the length of the rail, said primary coils acting as transmitting antennas and the seat being associated with one or more receiving antennas, the or each receiving antenna being in the form of at least one secondary electromagnetic coil, the arrangement further comprising means to supply a signal to at least one transmitting antenna to transfer power to at least one receiving antenna, there being a safety device mounted in or on the seat, actuating means being provided to use the power transferred to the said receiving antenna to actuate the said safety device, the arrangement incorporating selector means adapted to select the primary coil or coils which receive power to be transferred to the secondary coil or coils, there being a seat position sensor adapted to sense the position of the or each seat mounted on the rail, and to control the selector means in dependence upon the sensed position of the or each seat to supply the power to one or more primary coils adjacent the or each seat.

In a preferred embodiment the transmitting antennas that are associated with the rail extend immediately adjacent the rail or, in a most preferred embodiment, are mounted in or on the rail. Also it is preferred that the one or more receiving antennas associated with the seat are mounted on a part of the seat immediately adjacent the rail, with the antenna or antennas preferably being mounted on part of the seat that engages the rail.

The primary and secondary coils may be each wound about a vertical axis.

Conveniently the signal supplied to the primary coil or coils has a frequency of substantially 20 kHz.

Preferably the or each primary coil is of elongate form, the longitudinal axis of the coil being aligned with the axis of the rail.

Preferably the or each secondary coil is connected to the actuating means via rectifier means.

Advantageously a plurality of secondary coils are provided, each of the secondary coils being connected to a respective rectifier means, the output of the rectifier means being connected in parallel to the actuating means.

Conveniently three secondary coils are provided, and two secondary coils are located adjacent each other, with the third secondary coil over-lapping the two adjacent secondary coils.

Preferably the length of each of said three coils is approximately one-half the length of the seat.

Advantageously each coil is provided with a ferrite core.

Conveniently a capacitor is provided in the seat, power from the or each receiving antenna being used to charge the capacitor, means being provided to cause the capacitor to discharge to actuate the safety device in response to an accident being detected.

Preferably the means to cause the discharge of the capacitor comprise a crash sensor and means to transmit a predetermined signal in response to the detection of a crash, the seat being provided with means to receive the signal and means to respond to the received signal to discharge the capacitor to actuate the safety device.

Conveniently the transmitting and receiving means are adapted to transmit the signal via said transmitting and receiving antennas.

In an alternative embodiment a crash sensor is provided adapted to activate said signal supplying means in response to the detection of a crash.

Preferably the vehicle seat which is movably mounted on the rail is mounted for axial movement alone the rail.

Alternatively, or additionally, the vehicle seat which is movably mounted on the rail may be mounted to be removable from the rail.

Preferably means are provided to sense the condition of the seat and to inhibit actuation of the safety device if the seat is in a predetermined condition.

Advantageously the means to sense the condition of the seat are adapted to generate a predetermined signal if the seat is in a folded condition resembling a table to inhibit actuation of the safety device whilst the seat is in that condition.

Conveniently the seat incorporates a safety device which comprises a pyrotechnic charge, and the actuating means comprises a squib to ignite the pyrotechnic charge, the squib being adapted to receive power from the receiving antenna.

The safety device may comprise a pyrotechnic pre-tensioner, or an air bag.

BRIEF DESCRIPTION OF THE DRAWINGS

In order that the invention may be more readily understood, and so that further features thereof may be appreciated, the invention will now be described, by way of example, with reference to the accompanying drawings in which.

DETAILED DESCRIPTION OF THE INVENTION

Figure 1:
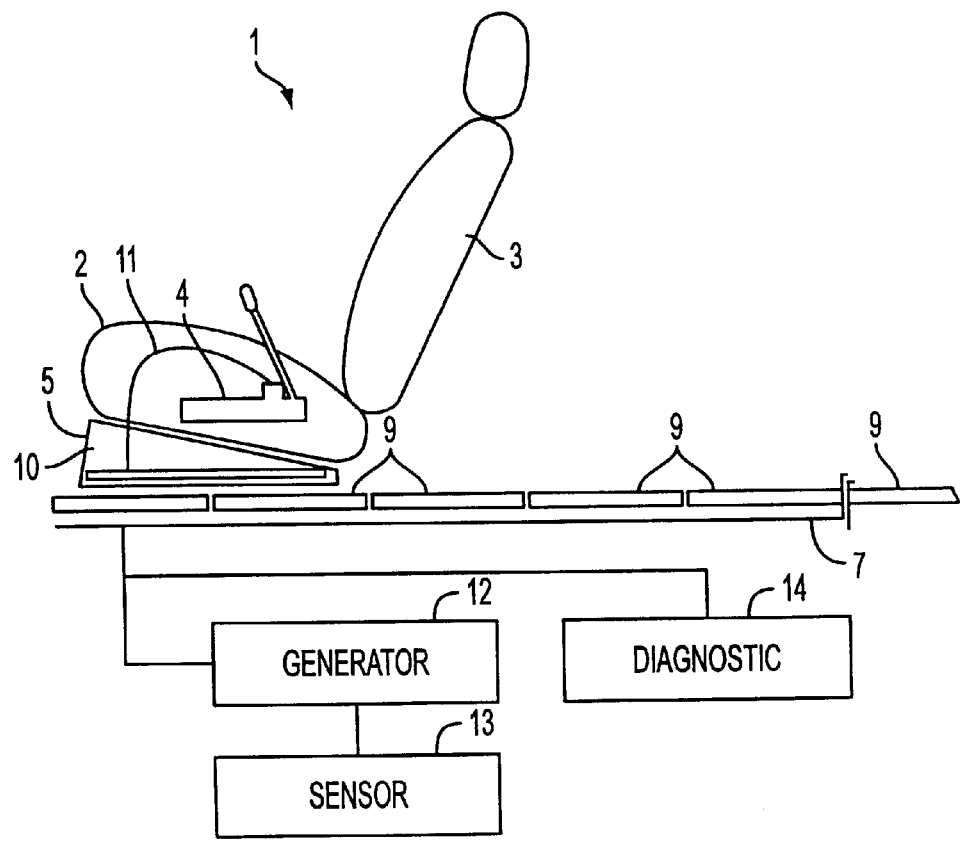
FIG. 1 is a part block diagram and part schematic illustration of a vehicle seat mounted in position on a rail, forming part of one embodiment to the invention.
Figure 2:
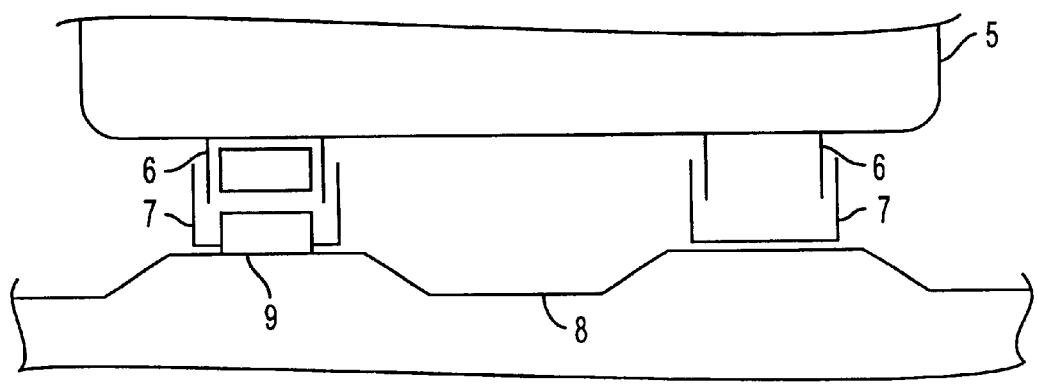
FIG. 2 is a scrap sectional view of the arrangement of FIG. 1 showing part of the vehicle seat and part of the rail.

Referring now to FIG. 1 of the accompanying drawings, a vehicle seat 1 is illustrated comprising a squab 2 and a back 3. Mounted on the seat 1 is a pre-tensioner 4 which incorporates a pyrotechnic arrangement which can be actuated in the event that an accident should occur. The seat and the pre-tensioner are of a conventional form.

The seat is mounted on a carriage 5. The carriage 5 has depending elements 6 which co-operate with rails 7 mounted on the floor 8 of a motor vehicle so that the seat may slide backwardly and forwardly axially along the rails. Mounted within one of the rails 7 is a plurality of spaced apart transmitting antennas constituted by primary electromagnetic coils 9 as will be described hereinafter in greater detail, and mounted on the carriage 5 supporting the seat, is at least one receiving antenna constituted by one or more secondary electromagnetic coils which form a secondary coil arrangement 10. The secondary coil arrangement 10 is mounted adjacent and immediately above a primary coil 9 regardless of the position of the seat 1 on the rails 7.

It is preferred that the transmitting antennas are mounted immediately adjacent one of the rails or within one of the rails, as described above, with the receiving antenna being mounted on part of the seat that is immediately adjacent the rail, such as the carriage 5 that supports the seat, and which also engages the rail, as described above, since in this way the transmitting lobe of the transmitting antenna and the receiving lobe of the receiving antenna can easily be made to intersect, providing an excellent coupling between the transmitting antenna and the receiving antenna.

The secondary coil arrangement 10 is connected, by means of a lead 11, to a squib adapted to activate the pyrotechnic arrangement in the pre-tensioner 4, thus causing the pre-tensioner to function.

The primary coils 9 are fed with a relatively low frequency alternating signal generated by a signal generator 12 in response to an accident being detected by a crash sensor 13.

A diagnostic circuit 14 is also connected to the coils 9.

It is to be appreciated, therefore, that in response to an accident being sensed by the sensor, the signal generator 12 will generate an alternating current signal having a frequency of, for example, 20 kHz. The signal is fed to the primary coils 9 and, regardless of the position of the seat 1, a current is generated in the secondary coil arrangement 10 provided in the seat. Thus power is transferred from the transmitting antenna to the receiving antenna. The current from the secondary coil arrangement 10 is passed to the squib that forms part of the pyrotechnic device, thus causing the pre-tensioner to be actuated.

Figure 3:
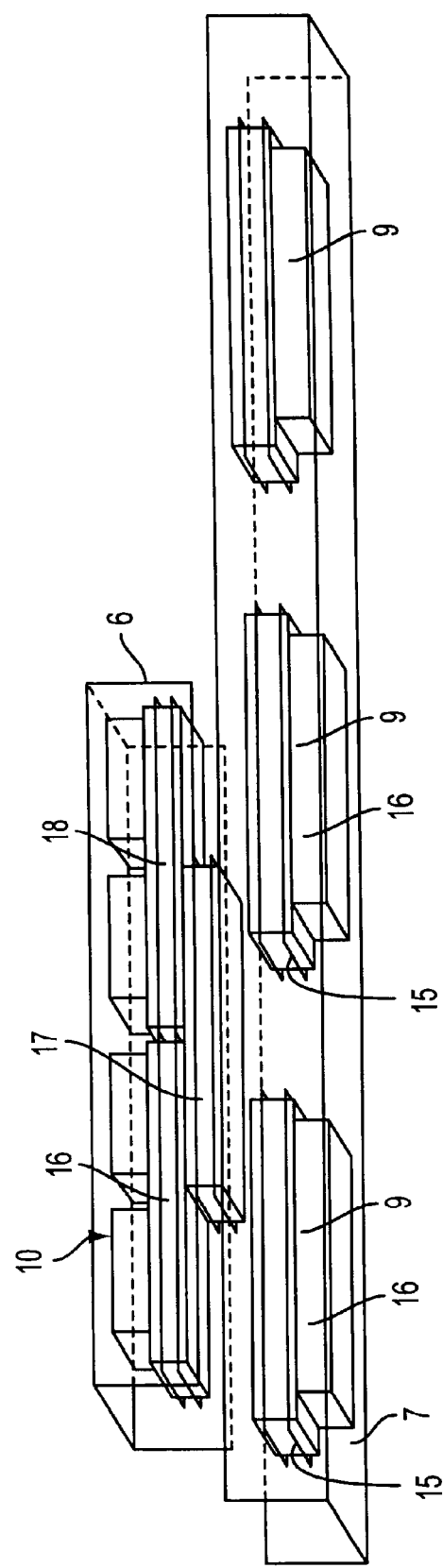
FIG. 3 is a perspective view, partly in phantom, illustrating the rail and part of the seat.

Referring now to FIG. 3 of the accompanying drawings, the element 6 depending from the carriage 5 of the seat, together with the associated secondary coil arrangement 10 is illustrated in greater detail together with the rail 7 and the primary coils 9. It is to be appreciated that the rail 7 and the depending element 6 from the carriage of the seat have been illustrated purely schematically and illustrate co-operating elements which enable the carriage 5 to slide axially along the rail. Many different designs are well known to those skilled in the art, and consequently, the present illustration is primarily schematic.

At spaced apart positions along the rail 7 are three separate primary coils 9. Each primary coil is a substantially flat horizontal rectangular coil 15 which surrounds at least part of a ferrite block 16.

The primary coils 9 are preferably mounted within the rail 7 but, alternatively, may be mounted immediately adjacent the rail.

The primary coils 9 would, in a practical embodiment of the invention, be slightly spaced apart from each other. Each coil is of elongate form having a longitudinal axis which is aligned with the longitudinal axis of the rail. The length of each coil is approximately half the length of the seat. The distance between the adjacent primary coils is a quarter of the length of the seat.

As can be seen, located above the primary coils 9, is the secondary coil arrangement 10. The secondary coil arrangement actually comprises three secondary coils 16,17,18. The secondary coils 16 and 18 are located in a common plane adjacent each other, and the secondary coil 17 overlaps the coils 16 and 18, the mid point of the coil 17 being substantially aligned with the point where the coils 16 and 18 are immediately adjacent each other. Each of the coils 16,17,18 is of longitudinal rectangular form having a longitudinal axis which extends substantially parallel with the rail 7. Each coil 16,17,18 has a length which is substantially equal to half the length of the seat. Each coil 16,17,18 comprises an outer coil which is formed on a ferrite core, and lies in a horizontal plane.

The secondary coil arrangement 10 is preferably mounted on part of the seat that engages the rail, such as the depending elements 6 which are associated with the carriage 5 which supports the vehicle seat 1. An arrangement of this type optimises the coupling between the primary coils 9 and the secondary coil arrangement 10.

The air gap between the primary coils and the secondary coil arrangement is at a minimum.

Figure 4:
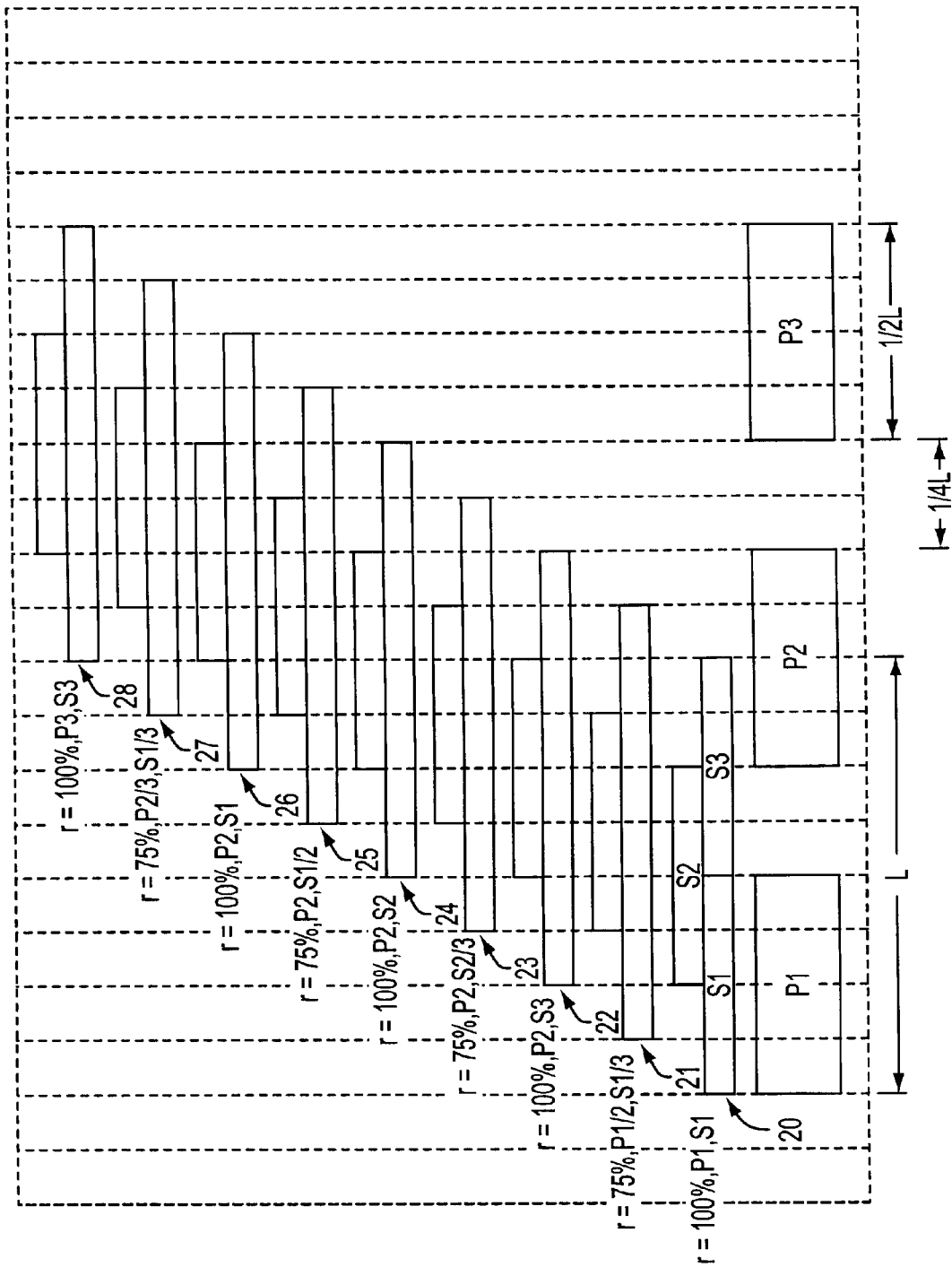
FIG. 4 is a diagrammatic view illustrating the relative position of primary coils mounted on the rail and secondary coils mounted on the seat in various positions of adjustment of the seat.

Referring now to FIG. 4 of the accompanying drawings, three primary coils P1, P2 and P3 are illustrated at spaced apart positions. As indicated by the reference numeral 20, a combination of three secondary coils identified as secondary coils S1, S2 and S3 is shown mounted in a predetermined position relative to the primary coils. It can be seen that the primary coil P1 is aligned with the secondary coil S1, meaning that the coupling function r between the primary coils and the secondary coils will be 100%.

If the seat carrying the secondary coils is slid along the rail to a second position as illustrated at 21 in FIG. 4, it can be seen that the primary coil P1 is aligned with part of the secondary coil S1 and the pirmary coil P2 is aligned with part of the secondary coil S3. Although the coils are not totally aligned there is still an adequate coupling between the coils and the total coupling function in this position is 75%.

When the seat is moved further to have the position indicated by the reference numeral 22, the secondary coil S3 is aligned with the primary coil P2 giving a coupling function of 100%.

As can be seen, as the seat occupies further positions as indicated by the reference numerals 23,24,25,26,27 and 28, in each position one secondary coil is aligned with one primary coil or two secondary coils are partially aligned with two primary coils meaning that the coupling function is always 75% or greater.

Consequently, by providing a number of primary coils spaced along the rail and by providing the three secondary coils, two of which are off-set relative to each other and the third of which effectively over-laps part of the two off-set coils, regardless of the position of the seat an adequate coupling function can be achieved. The length of the seat is shown in FIG. 4.

Figure 5:
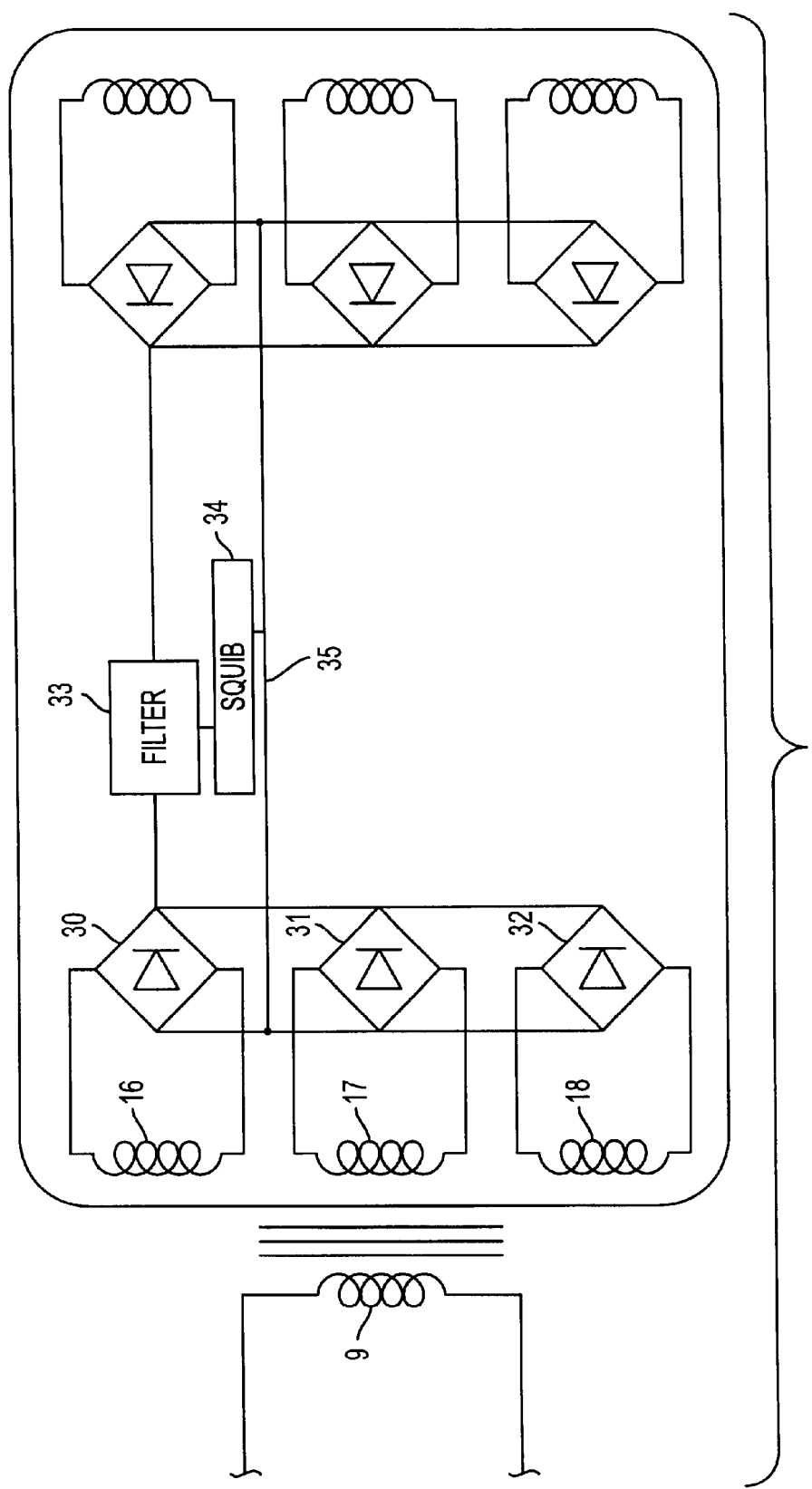
FIG. 5 is a circuit diagram illustrating part of the described embodiment of the invention.

Referring now to FIG. 5 of the accompanying drawings, the three secondary coils 16,17,18, provided at one side of the seat are illustrated, these coils being coupled to a primary coil 9. The figure also shows three further coils provided at the opposite side of the seat. These coils would function in the same way as the coils 16,17,18 if the seat were reversed so as to face the opposite way within the motor vehicle. Here it is to be understood that the invention relates to seats which are remountably mounted on the rail, and includes seats that may be removed from the rail, reversed in position and then re-mounted on the rail. When mounted on the rail such seats may be slidable along the rail, or may be prevented from sliding along the rail.

It can be seen that each coil 16,17,18 is connected to a respective rectifying diode bridge 30,31,32, the outputs of the diode bridges being connected in parallel. One output of the diode bridges is connected to a filter 33, which filters out spurious signals, the output of the filter being connected to a squib 34. The other outputs of the diode bridges are connected by means of a rail 35 to the squib 34.

Consequently, it will be appreciated that when an appropriate alternating current signal is passed through the primary coil 9, that signal will be coupled to the secondary coils 16,17,18 and will generate a voltage across the secondary coils. The voltage generated across the secondary coils will be rectified by the diode bridges 30,31,32 and the rectified voltage will be applied to a squib 34. Only the secondary coil having the highest voltage across it will drive a current through the squib. The squib 34 will actuate a pyrotechnic charge which will in turn actuate the safety device provided in the seat which is, in the example given, a pre-tensioner.

In the embodiment described with reference to FIGS. 1 to 5, the alternating current generator 12 is activated in response to the occurrence of an accident. In an alternative embodiment of the invention, however, the alternating current generator functions continuously, and electric power is coupled through the co-operating primary and secondary coils to a capacitor within the seat which stores electric charge. When an accident occurs, a control signal is passed to an appropriate control arrangement in the seat, which will be described hereinafter, which causes the capacitor to discharge through the squib, thus actuating the safety device. The control signal may be a coded signal which is transmitted by an appropriate transmitter. The control signal may be transmitted through the above-described co-operating primary and secondary coils, but separate means may be provided to pass the control signal to the control arrangement.

Figure 6:
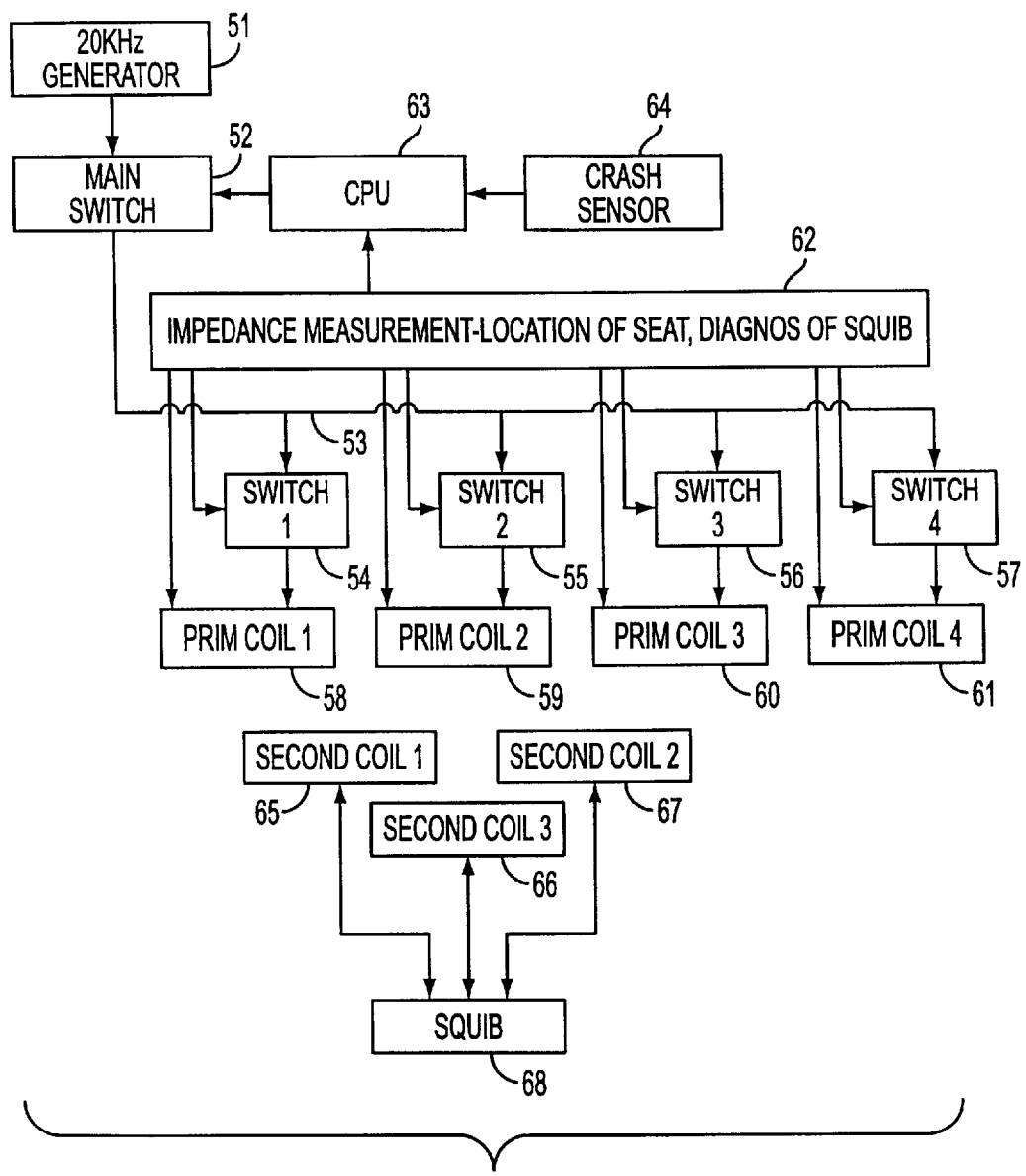
FIG. 6 is a block diagram of the embodiment of the invention of FIGS. 1 to 5.

Referring now to FIG. 6 which is a block diagram of the described embodiment of the invention, a 20 kHz signal generator 51 is illustrated, the output of which is connected, by means of a main switch 52, to a bus bar 53. The bus bar 53 is connected by means of separate switches 54, 55, 56, 57 to separate primary transmitting electromagnetic coils 58, 59, 60, 61. The primary coils are each connected to impedance measurement circuit 62, the function of which will be described hereinafter. A central processing unit 63, for example in the form of a micro-processor is provided connected to the main switch and also connected to the impedance measurement circuit 62. A crash sensor 64 is provided which is connected to the central processor unit 63.

The primary coils 58–61 are mounted at spaced apart positions along the length of a rail on which a seat is slideably mounted.

Mounted on the seat are a plurality of secondary coils 65, 66, 67. The secondary coils are each being connected to a squib 68, which is adapted to activate a pyrotechnically deployed safety device provided on the seat.

The primary coils 58–61 are preferably mounted in position immediately adjacent the rail or, most preferably, on or in the rail. The secondary coils 65–67 are preferably mounted on part of the seat immediately adjacent the rail, the most preferred location being the part of the carriage on which the seat is supported that actually engages the rails.

In ordinary use of the arrangement shown in FIG. 6, the impedance measurement circuit 62 will measure the impedance of each of the primary coils 58, 59, 60 and 61 sequentially, and from the measured values calculations are made concerning the location of the seat. It is to be understood that the impedance of a primary coil, as measured by the impedance measuring circuit 62, will depend upon whether the secondary coil arrangement 65, 66, 67 is adjacent the coil, in the vicinity of the coil or remote from the coil. From signals obtained by the impedance measurement circuit it is also possible to effect a diagnosis as to the condition of the squib in order to confirm that the squib is functioning in a satisfactory manner. The impedance of the primary coil is, of course, dependant to a certain extent on impedance existing across the terminals of an adjacent secondary coil. Consequently, it is possible to confirm, by making appropriate measurements, that the squib is functioning.

The impedance measurement circuit is connected to each of the switches 54, 55, 56, 57 and the impedance measuring circuit 62 will act to close the switches of the primary coils which are located closest to the secondary coil arrangement carried by the seat. If the coils have the relative position as shown in FIG. 7, the impedance measurement circuit will render the switch 55 conductive so that the primary coil 59 is connected to the bus bar 53.

In the event that an accident should occur and be sensed by crash sensor 64, an appropriate signal is passed at the central processing unit 63 which closes the main switch 52, thus causing a 20 kHz signal to be applied to the bus bar 53. The signal will pass through the closed switch 55 to the primary coil 59 and will consequently transfer power to the secondary coil 66 which is substantially aligned (in the position illustrated in FIG. 6) with the primary coil 59. The squib will thus be activated.

It is to be understood that if the seat is mounted on a very long rail, and if the rail has a length such that two seats may be accommodated, there may be a relatively large number of primary coils adjacent each other and a first seat may be adjacent some of the primary coils with the second seat being adjacent others of the primary coils. In such an embodiment the impedance measurement circuit would close a switch or switches associated with the primary coils located in the vicinity of each seat, so that, in the event that a crash is sensed by the crash sensor 64, the signal passed by the signal generator 51 to the bus bar 53 will be passed to two or more spaced-apart primary coils and will thus be transferred to the secondary coil arrangements provided on both of the seats present on the rail.

It is to be appreciated that in the described embodiment of the invention there is no direct electrical connection between the seat and the rail on which the seat is mounted. Thus the seat may be totally removed from the rail, and may subsequently be replaced on the rail, without the person carrying out this operation being needed to complete any electrical connections. Also, of course, the seat may be moved along the rail to any appropriate position whilst electrical power from the primary coils may be passed to the secondary coils, thus rendering the safety device in the seat effective, without there being any wires that may become snagged or damaged.

If the embodiment is utilised in which the capacitor becomes charged up within the seat, it is not essential for there to be a particularly high coupling factor between the transmitting antenna and the secondary antenna, provided that the arrangement is such that the capacitor will be charged sufficiently to actuate the safety device within a short period of time after the motor vehicle is switched on.

What is claimed is:

1. A safety arrangement for use in a motor vehicle, the safety arrangement comprising rail means including a rail provided on the floor of the vehicle and a vehicle seat movably mounted on the rail means, the rail being associated with a plurality of primary coils at positions spaced along a length of the rail, said primary coils acting as transmitting antennas and the seat being associated with at least one receiving antenna, the at least one receiving antenna being in the form of at least one secondary electromagnetic coil, the arrangement further comprising means to supply a signal to at least one of the transmitting antennas to transfer power to the at least one receiving antenna, there being a safety device which is one of mounted in and mounted on the seat, actuating means being provided to use the power transferred to the at least one receiving antenna to actuate the safety device, the arrangement incorporating selector means adapted to select at least one of the primary coils which receives power to be transferred to the at least one secondary coil, there being a seat position sensor adapted to sense the position of the seat mounted on the rail, and to control the selector means in dependence upon the sensed position of the seat to supply the power to at least one of the primary coils adjacent the seat.

2. An arrangement according to claim 1 wherein the primary and secondary coils are each wound about a vertical axis.

3. An arrangement according to claim 1 wherein the signal supplied to the primary coils has a frequency of substantially 20 kHz.

4. An arrangement according to claim 1 wherein each primary coil is of elongate form, the longitudinal axis of the coil being aligned with the axis of the rail.

5. An arrangement according to claim 1 wherein each secondary coil is connected to the actuating means via rectifier means.

6. An arrangement according to claim 1 wherein a plurality of secondary coils are provided, each of the secondary coils being connected to a respective rectifier means, the output of the rectifier means being connected in parallel to the actuating means.

7. An arrangement according to claim 1 wherein three secondary coils are provided.

8. An arrangement according to claim 7 wherein two secondary coils are located adjacent each other, with the third secondary coil over-lapping the two adjacent secondary coils.

9. An arrangement according to claim 7 wherein the length of each of said three coils is approximately one-half the length of the seat.

10. An arrangement according claim 1 wherein each coil is provided with a ferrite core.

11. An arrangement according to claim 1 wherein a capacitor is provided in the seat, power each receiving antenna being used to charge the capacitor, means being provided to cause the capacitor to discharge to actuate the safety device in response to an accident being detected.

12. An arrangement according to claim 11 wherein the means to cause the discharge of the capacitor comprise a crash sensor and means to transmit a predetermined signal in response to the detection of a crash, the seat being provided with means to receive the signal and means to respond to the received signal to discharge the capacitor to actuate the safety device.

13. An arrangement according to claim 12 wherein the transmitting and receiving means are adapted to transmit the signal via said transmitting and receiving antennas.

14. An arrangement according to claim 1 wherein a crash sensor is provided adapted to activate said signal supplying means in response to the detection of a crash.

15. An arrangement according to claim 1 wherein the vehicle seat which is movably mounted on the rail means is mounted for axial movement along the rail.

16. An arrangement according to claim 1 wherein the vehicle seat which is movably mounted on the rail is mounted to be removable from the rail.

17. An arrangement according to claim 1 wherein means are provided to sense the condition of the seat and to inhibit actuation of the safety device if the seat is in a predetermined condition.

18. An arrangement according to claim 17 wherein the means to sense the condition of the seat are adapted to generate a predetermined signal if the seat is in a folded condition resembling a table to inhibit actuation of the safety device whilst the seat is in that condition.

19. An arrangement according to claim 1 wherein the seat incorporates a safety device which comprises a pyrotechnic charge, and the actuating means comprises a squib to ignite the pyrotechnic charge, the squib being adapted to receive power from the receiving antenna.

20. An arrangement according to claim 19 wherein the safety device comprises a pyrotechnic pre-tensioner.

21. An arrangement according to claim 19 wherein the safety device comprises an air-bag.

* * * * *